US011078393B2

(12) United States Patent
Sherman et al.

(10) Patent No.: US 11,078,393 B2
(45) Date of Patent: Aug. 3, 2021

(54) NON-TOXIC HIGH-DENSITY FLUID FOR COMPLETION APPLICATIONS

(71) Applicant: Terves Inc., Euclid, OH (US)

(72) Inventors: Andrew Sherman, Mentor, OH (US); Haixong Tang, Euclid, OH (US)

(73) Assignee: Terves, LLC, Euclid, OH (US)

( * ) Notice: Subject to any disclaimer, the term of this patent is extended or adjusted under 35 U.S.C. 154(b) by 94 days.

(21) Appl. No.: 16/159,869

(22) Filed: Oct. 15, 2018

(65) Prior Publication Data

US 2019/0112516 A1 Apr. 18, 2019

Related U.S. Application Data

(60) Provisional application No. 62/572,816, filed on Oct. 16, 2017.

(51) Int. Cl.
*C09K 8/03* (2006.01)

(52) U.S. Cl.
CPC ................. *C09K 8/032* (2013.01); *C09K 8/03* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 3,057,797 A | 10/1962 | Anderson et al. | |
| 4,602,820 A | 7/1986 | Hard | |
| 6,586,372 B1 | 7/2003 | Bradbury et al. | |
| 7,267,291 B2 | 9/2007 | Bradbury et al. | |
| 7,449,431 B2 | 11/2008 | Bradbury et al. | |
| 7,538,074 B2 | 5/2009 | Bradbury et al. | |
| 7,589,049 B2 | 9/2009 | Bradbury et al. | |
| 7,618,927 B2 | 11/2009 | Massam et al. | |
| 7,651,040 B2 | 1/2010 | Bradbury et al. | |
| 7,651,983 B2 | 1/2010 | Massam et al. | |
| 7,727,939 B2 | 6/2010 | Bradbury et al. | |
| 7,745,380 B2 | 6/2010 | Bradbury et al. | |
| 7,854,277 B2 | 12/2010 | Duncum et al. | |
| 8,309,497 B1 | 11/2012 | Zhang | |
| 9,682,425 B2 | 6/2017 | Xu et al. | |
| 2003/0102128 A1* | 6/2003 | Dawson | C09K 8/68 |
| | | | 166/280.2 |
| 2003/0124048 A1 | 7/2003 | Hardinghaus et al. | |
| 2004/0127366 A1 | 7/2004 | Bradbury et al. | |
| 2004/0253170 A1 | 12/2004 | Zhou et al. | |
| 2005/0028979 A1* | 2/2005 | Brannon | C09K 8/62 |
| | | | 166/280.2 |
| 2005/0101493 A1 | 5/2005 | Bradbury et al. | |
| 2006/0188651 A1 | 8/2006 | Bradbury et al. | |
| 2007/0281867 A1 | 12/2007 | Massam et al. | |
| 2010/0009874 A1 | 1/2010 | Ballard et al. | |
| 2012/0305254 A1 | 12/2012 | Chen | |
| 2013/0125476 A1 | 5/2013 | Enomoto et al. | |
| 2014/0228258 A1* | 8/2014 | Mahoney | C09K 8/80 |
| | | | 507/219 |
| 2015/0119301 A1* | 4/2015 | McDaniel | C09K 8/805 |
| | | | 507/224 |
| 2015/0191983 A1 | 7/2015 | Offenbacher et al. | |
| 2016/0137904 A1* | 5/2016 | Drake | C09K 8/524 |
| | | | 507/219 |
| 2016/0215208 A1* | 7/2016 | Monastiriotis | C09K 8/805 |
| 2017/0088762 A1 | 3/2017 | Zhang et al. | |
| 2018/0155602 A1* | 6/2018 | Zhang | C09K 8/92 |

FOREIGN PATENT DOCUMENTS

| | | |
|---|---|---|
| AU | 2013249743 | 10/2013 |
| CA | 2905504 | 4/2016 |
| WO | 2011112831 | 9/2011 |
| WO | 2017007781 | 1/2017 |

OTHER PUBLICATIONS

Iranparast et al. "Parametric Evaluation of Novel, Basic and Effective Parameetrs on Performance of Nano Drilling Fluid" Chemistry Journal, vol. 3, No. 1, pp. 1-5 (2017).
International Search Report/Written Opinion, U.S. Search Authority for corresponding application PCT/US2018/055798 (Dec. 21, 2018).

* cited by examiner

*Primary Examiner* — John J Figueroa
(74) *Attorney, Agent, or Firm* — Ulmer & Berne LLP; Brian Turung; Eric Robbins

(57) ABSTRACT

A modified high density brine for use in subterranean drilling and completion operations. The modified high density brine includes the addition of high density particle addition that can optionally be surface-modified. The resultant modified high density brine eliminates the need for toxic, corrosive, and costly $ZrBr_2$ additions or other ionic additives to boost the density of the modified high density brine to 15-17 lbs./gallon or greater.

44 Claims, No Drawings

NON-TOXIC HIGH-DENSITY FLUID FOR COMPLETION APPLICATIONS

The present invention claims priority on U.S. Provisional Application Ser. No. 62/572,816 filed Oct. 16, 2017, which is incorporated herein by reference.

FIELD OF THE INVENTION

The present invention relates to drilling and completion fluids for use in hydrocarbon-bearing and geothermal subterranean formations and to methods of drilling and completing subterranean zones using those fluids. In particular, the present invention is directed to a high-density brine for use in subterranean drilling and completion operations. The high density brine includes the addition of high density nanoparticles that have been surface-modified that have been added to a standard brine such as a $CaBr_2$ brine solution. The resultant brine eliminates the need for toxic, corrosive, and costly $ZrBr_2$ or cesium formate additions or other ionic additives to boost the brine density to 15-17 lbs./gallon or greater.

BACKGROUND OF THE INVENTION

Various procedures have been used to increase or otherwise improve the flow of hydrocarbons from hydrocarbon-containing subterranean formations penetrated by wellbores, and for enhancing recovery of geothermal and other in situ resources. Specially formulated fluids are used in connection with drilling, completion, and workover operations to contain and manage pressures during drilling and completion operations, and to minimize damage to the formation. Completion fluids are used after drilling is complete and during the steps of completion, or recompletion, of the well. Completion operations normally include cementing the casing, perforating the casing and setting the tubing and pumps prior to, and to facilitate initiation of production in hydrocarbon recovery operations. Workover fluids are used during remedial work in the well, such as removing tubing, replacing a pump, logging, reperforating, and cleaning out sand or other deposits. Drilling fluids are used during the initial drilling of the wellbore. The various functions of drilling, completion and workover fluids include controlling well pressure, preventing the well from blowing out during drilling, completion or workover, and preventing the collapse of the well casing due to excessive pressure build-up. The fluid is meant to help control a well without damaging the producing formation or drilling and completion components. Specific drilling and completion fluid systems are selected to optimize the well completion operation in accordance with the characteristics of a particular geological formation.

Drilling fluids are used while drilling to and through a producing or target zone of a hydrocarbon or other (geothermal, mineral) resource-bearing subterranean formation. Completion fluids are used when completing or recompleting or working over a well. These drilling fluids are typically comprised of freshwater or clear brines.

Seldom is regular drilling mud suitable for completion operations due to its solids content, pH and ionic composition. Drill-in fluids can, in some cases, be suitable for both drilling and completion work. Drilling fluids can contain suspended solid matter consisting of particles of many different sizes. Some suspended material will be large enough and heavy enough to settle rapidly to the bottom of a container if a liquid sample if left to stand (the settable solids). Very small particles will settle only very slowly or not at all if the sample is regularly agitated or the particles are colloidal. These small solid particles typically cause the liquid to appear turbid (i.e., cloudy or hazy). The potential of particle invasion and/or filter cake buildup to damage a formation by reducing permeability in the producing zone has been recognized for many years.

The use of heavy brines as drilling and completion fluids is now widespread, particularly in offshore environments. Most heavy brines used are calcium halide brines, particularly calcium chloride or calcium bromide brines, sodium halide brines, particularly sodium chloride or sodium bromide, potassium chloride, zinc bromide, or formate brines, particularly potassium or cesium formate. Some drilling fluids also use carbonate brines.

Oil companies in the early 1970's realized the importance of reducing solids in the wellbore fluids in an attempt to achieve higher well production. Brines were originally used to reduce formation damage during the completion of geo-pressured wells in the Gulf of Mexico where seawater was often filtered and displaced into wells during perforation or gravel-packing operations. The low-solids seawater reduced formation damage caused by particulate plugging of pore throats in the producing formation or in the gravel pack. In abnormally pressured wells, higher density brines were needed for pressure control. Sodium chloride salt was added to seawater to increase the density from 8.5 to 10 lbs./gal. High density brines with densities from 10 lbs./gal to 19.2 lbs./gal were developed over thirty years ago and are still key components in well completion operations. These heavy brines include high concentration mixtures of calcium chloride ($CaCl_2$), calcium bromide ($CaBr_2$) and/or zinc bromide ($ZnBr_2$) salts. Other formulations, such as potassium chloride and sodium bromide, are used in specialty applications as well as sodium, potassium or cesium formate.

The users of high density brines typically request the least expensive clear brine that has a specified density and a specified crystallization temperature. The density is specified in order to produce a hydrostatic pressure in the well bore that is high enough to control formation pressures. The crystallization temperature is specified near the lowest anticipated cold weather temperature in order to prevent crystallization of salt solids in the brine, while utilizing the most economical formulation.

Precipitation of salt solids in the brines at or below the crystallization temperature can lead to several rig problems. As high density brines are normally formulated, the crystallization temperature is the temperature at which the brine is saturated with one of the salts that it contains. At the crystallization temperature, the least soluble salt becomes insoluble and precipitates. Cooling the brine below the crystallization temperature results in even more precipitation of salt solids from the brine.

The below table provide examples of attainable brine densities of brines that are currently used in well completion operations.

| Brine | Total Salt Conc. (wt. %) | Density at 70° F. (lbs./gal.) | (g/cc) | Pressure Gradient (psi/ft.) |
|---|---|---|---|---|
| $NH_4Cl$ | 24 | 8.9 | 1.07 | 0.462 |
| KCl | 26 | 9.8 | 1.17 | 0.509 |
| NaCl | 26 | 10.0 | 1.20 | 0.519 |
| KBr | 39 | 11.4 | 1.37 | 0.592 |
| $CaCl_2$ | 38 | 11.6 | 1.39 | 0.602 |
| NaBr | 45 | 12.4 | 1.49 | 0.644 |

-continued

| Brine | Total Salt Conc. (wt. %) | Density at 70° F. (lbs./gal.) | (g/cc) | Pressure Gradient (psi/ft.) |
|---|---|---|---|---|
| $CaCl_2/CaBr_2$ | 60 | 15.1 | 1.81 | 0.784 |
| $CaCl_2/CaBr_2/ZnBr_2$ | 77 | 19.2 | 2.30 | 0.997 |

In today's deep water completion operations, operators are concerned about corrosion, toxicity, density and crystallization of the well completion fluid, as well as fluid costs. Zinc bromide-containing brines are acidic and must be kept acidic to prevent precipitation of zinc hydroxide. Zinc fluids are also classified as "marine pollutants" in the U.S. and have been prohibited for use in the North Sea since the 1990s, thus there is a reluctance to use such zinc bromide-containing brines. Cesium formates have replaced zinc brines in the North Sea; however, operator costs for such brines have greatly escalated as compared to other completion fluids. U.S. operators that are reluctant to use cesium have sought out other brines that contain no zinc or chlorides and do not rely on formates to keep the cost low.

On-site filtration of completion fluids prior to their exposure to the formation is critical in completion work. By their very nature, these completion fluids are formulated to be solids-free and any contaminants introduced to the system during blending, transportation and completion activities should be removed before the fluid comes in contact with the formation. Ideally, to minimize formation damage, the brine should be free of all solids. However, from a practical standpoint, in most cases solids removal to 2 microns or smaller is generally a reasonable standard. The final decision on solids removal should be based upon the permeability and porosity of the formation. There are several filtration systems available for clear brine completion fluids. The most common systems are diatomaceous earth (DE) filter presses and high surface area pleated element systems.

The decrease in oil and gas prices and increasing regulatory environment has led to searches for reducing cost and environmental impact in drilling operations, including increased emphasis on environmental compatibility of fluids used in drilling and safety concerns for rig personnel and other handlers of the fluids. There is a need for more options for lower cost, lower toxicity, and reduced corrosivity drilling fluids.

SUMMARY OF THE INVENTION

The present invention relates to a modified high density brine that includes the addition of surface modified high density nanoparticles. The modified high density brine of the present invention can be used to eliminate the need for toxic, corrosive, and costly $ZrBr_2$ additions or other ionic additives to boost the brine density to 15-17 lbs./gallon or greater. The modified high density brine of the present invention can be used in drill-in, completion, and/or workover operations.

In one non-limiting aspect of the present invention, the addition of suspended solids is used in the modified high density brine of the present invention to control viscosity, chemistry (pH), and density of the fluid. As defined herein, 'nanoparticles' are particles that are less than 200 nm in diameter.

In another and/or alternative aspect of the present invention, the density of the modified high density brine of the present invention can be increased through the addition of high density particle addition. The high density particle addition includes or is formed of ultrafine particles, or through the addition of larger high density particles which have been stabilized against settling or screen-out. Such particles can include metallic materials having a density greater than 5 g/cc, typically greater than 6 g/cc, and more typically greater than 7 g/cc such as, but not limited to, 1) metal particles of iron, tungsten, chromium, cobalt, nickel, copper, zinc, manganese, molybdenum, bismuth, lead, and/or tin; 2) oxide and/or ceramic particles such as, but not limited to, $CeO_2$, $WO_3$, $WO_2$, WC, $WCl_3$, $Fe_3O_4$, $Fe_2O_3$, $TiO_2$, $Cr_2O_3$, $ZrO_2$, zirconates, tungstates, ferrites, BaO, and/or $Bi_2O_3$; and/or 3) high density sulfide, nitride, oxide, and/or intermetallic compound particles having a density greater than 2.5 g/cc, typically greater than 4 g/cc, and more typically greater than 5 g/cc such as, but not limited to TaN, ZnO, $BaTiO_3$, $Al_2O_3$, and/or $SiO_2$. The high density particle additionally can include the same type of material or be formed of two or more different material. In one non-limiting example, the addition of 1 kg of high density particles (e.g., density greater than 5 g/cc) to a heavy brine solution (e.g., $CaBr_2$ heavy brine, etc.) can increase the density of the heavy brine to about 17 lbs./gallon or greater without the need of using corrosive and costly $ZnBr_2$. As defined herein, a "heavy brine" is a brine solution having a density of at least 8.5 lbs./gallon. Non-limiting heavy brines that can be modified by the high density particle addition of the present invention include, but are not limited to, $NH_4Cl$ brine, KCl brine, NaCl brine, KBr brine, $CaCl_2$ brine, NaBr brine, $CaBr_2$ brine, and $CaCl_2/CaBr_2$ brine. Generally, the salt concentration of the heavy brines is about 22-65 wt. % (and all values and ranges therebetween). The amount of the high density particle addition of the present invention to the heavy brine is selected to increase the density of the heavy brine by at least 12%, and up to 200% (and all values and ranges therebetween). Generally, the heavy brine prior to the high density particle addition in accordance with the present invention is about 8.9-16 lbs./gallon, and typically about 11-16 lbs./gallon at room temperature (i.e., 77° F.). Depending on the application, the addition of a stable ultrafine particle that does not filter or screen out from the heavy brine may be desirable; alternatively, a stabilized suspension of larger particles that cannot penetrate fine porosity may be desirable.

In another and/or alternative aspect of the present invention, the high density particles of the present invention that are added to the heavy brine to increase the density of the heavy brine are added to the heavy brine at a concentration of about 2-35 parts by weight high density particles to 100 parts by weight of heavy brine (and all values and ranges therebetween), typically about 5-30 parts by weight high density particles to 100 parts by weight of heavy brine, and more typically about 8-25 parts by high density particles to 100 parts by weight of heavy brine. If the concentration of the high density particles is less than 2 parts by weight to 100 parts by weight heavy brine, the density increase produced by the high density particle addition is not sufficient to affect the weight of the heavy brine. If the concentration of the high density particles is greater than 35 parts by weight to 100 parts by weight heavy brine, the high density particles in the heavy brine tend to aggregate in the heavy brine, and the viscosity of the heavy brine thus excessively increases. In one non-limiting embodiment, the high density particle addition is added at a concentration of 1-5 lbs./gallon (and all values and ranges therebetween), and typically 0.5-2 lbs./gallon to the heavy brine; however, this is not required.

In another and/or alternative aspect of the present invention, the high density particles that are added to the heavy brine to increase the density of the heavy brine can be selected to reduce or prevent plugging of filters and/or meet the standards of solids-free brine. In one non-limiting embodiment, the high density particles that are added to the heavy brine to increase the density of the heavy brine are less than one-half micron, typically less than 0.4 micron, and more typically less than 0.2 micron. In one non-limiting embodiment, the mean particle size of the high density particle addition is 5-400 nm (and all values and ranges therebetween), typically about 10-300 nm, and more typically 10-200 nm. When the mean size of the particles of the high density particle addition is less than 5 nm, the solution viscosity of the brine can increase too much. When the mean particle size of the high density particle addition is more than 400 nm, the brine can clog filters (400+ nm particles do not readily pass through a 2 micron filter). For performance reasons, 10-80 nm particles of the high density particle addition can be used since such particles have the lowest possible impact on formation and filter plugging, while having reasonable dispersion and viscosity effects, and result in transparent/clear brines. For lowest cost, 100-300 nm can be used due to regulatory environments on particles of less than 100 nm, and reduced costs for particle synthesis and surface modification. Mean size of the particle is the median value or cumulative center value of volume distribution measured by laser diffraction type particle size distribution meter.

In another and/or alternative aspect of the present invention, the high density particle addition that is added to the heavy brine to increase the density of the heavy brine can be treated to enhance the suspension of the added high density particle addition in the heavy brine and/or to control the macroscopic brine properties such as, but not limited to pH, viscosity, and crystallization temperature. In one non-limiting embodiment of the invention, one or more functional surface coatings can be applied to the particles of the high density particle addition prior to such particles being added to the heavy brine. Non-limiting examples of such one or more coatings include 1) siloxanes and/or silizane and/or other inorganic-organic coupling agents that are used to add permanent surface charges and/or functionality to the particles, and/or 2) polyacrylamides or other hydrogel-forming molecules that can attach to the particle outer surface of the high density particle addition to form an extended gel network and/or to inhibit or prevent settling of larger added particle of the high density particle addition in the heavy brine. Multiple coatings can be used to activate/enable the surface to accept additional coatings, modify the net particle size, and customize the particle/brine system properties such as, but not limited to pH, viscosity, and crystallization temperature.

In another and/or alternative aspect of the present invention, the heavy brine can optionally include additional heavy salt additions such as, but not limited to, $ZrBr_2$, $ZrI_2$, cerium chloride, $CeCl_3$, and/or cerium bromide, $CeBr_3$, in concentrations from 5-65% by weight (and all values and ranges therebetween), and typically 10-20% by weight.

In another and/or alternative aspect of the present invention, a dispersant can optionally be added to the heavy brine that includes the particles of the high density particle addition. The dispersant is a compound soluble in water and brine solutions. Generally, the solubility of dispersant in water or brine is about 0.1-99.9 wt. % (and all values and ranges therebetween). The dispersant can be a water-soluble anionic dispersant, water-soluble nonionic dispersant, water-soluble cationic dispersant, and/or water-soluble amphoteric dispersant. Non-limiting examples of dispersant that can be used include, but are not limited to, polymer dispersant of polycarboxylic acid type such as poly (meth) acrylate. A polymer dispersant having an ammonium acrylate salt as a constituent unit of the copolymer component can be used. Non-limiting examples of a polymer dispersant having ammonium acrylate salt as a constituent unit of the copolymer component include ammonium polyacrylate salt, and copolymer ammonium salt of alkyl polyacrylate and acrylate. The dispersant can be composed of two or more types of dispersant including at least one type of polymer dispersant having ammonium acrylate salt as constituent unit as copolymer component, and at least one type selected from other dispersants. Non-limiting examples of water-soluble anionic dispersant include triethanolamine lauryl sulfate, ammonium lauryl sulfate, triethanolamine polyoxy ethylene alkyl ether sulfate, poly styrene sulfonic acid, poly acrylamido methylpropanesulfonate, 2-acrylamido-2-methylpropanesulfonate, 3-(methacryloylamino)propyl]dimethyl (3-sulfopropyl) ammonium hydroxide, Poly(2-acrylamido-3-methylpropnaesulfonate), poly(2-acrylamido-2-methyl-1-propanesulfonic acid-co-acrylic acid) with various ratios of comonomers, and polymer dispersant of polycarboxylate type. Non-limiting examples of polymer dispersant of polycarboxylate type include polymer of carboxylic monomer having unsaturated double bond such as acrylic acid, methacrylic acid, maleic acid, fumaric acid, itaconic acid, copolymer of carboxylic monomer having unsaturated double bond and other monomer having unsaturated double bond, and ammonium salt or amine salt of them. Non-limiting examples of water-soluble nonionic dispersant include polyoxy ethylene lauryl ether, polyoxy ethylene cetyl ether, polyoxy ethylene stearyl ether, polyoxy ethylene oleyl ether, polyoxy ethylene higher alcohol ether, polyoxy ethylene octyl phenyl ether, polyoxyethylene nonyl phenyl ether, polyoxyalkylene alkylether, polyoxyethylene derivative, polyoxyethylenesorbitan monolaurate, polyoxy ethylene sorbitan monopalmitate, polyoxy ethylene sorbitan monostearate, polyoxy ethylene sorbitan tristearate, polyoxy ethyelene sorbitan mono-oleate, polyoxy ethylene sorbitan trioleate, tetraoleic polyoxy ethylene sorbit, polyethylene glycol monolaurate, polyethylene glycol monostearate, polyethylene glycol distearate, polyethylene glycol mono-oleate, polyoxy ethylene alkylamine, polyoxy ethylene cured castor oil, 2-hydroxyethyl methacrylate, and alkyl alkanolamide. Non-limiting examples of water-soluble cationic dispersant include polyvinyl pyrrolidone, coconut amine acetate, and stearyl amine acetate. Non-limiting examples of water-soluble biphoteric dispersant include lauryl betaine, stearyl betaine, lauryl dimethylamine oxide, poly(sulfobetaine methacrylamide), block copolymers of (sulfobetaine methacrylamide)/(methacrylic acid), 3-([dimethyl(3-trimethoxysilyl)propyl]ammonio)propane-1-sulfonate, and 2-alkyl-N-carboxymethyl-N-hydroxy ethyl imidazolinium betaine. The dispersant (when used) is used for dispersing the particles of the high density particle addition in the heavy brine. When one or more types of dispersant are added to the heavy brine, the weight ratio of the particle addition of the high density particle addition to the dispersant is 20-80:1 (and all values and ranges therebetween), typically about 25-70:1, and more typically 30-50:1. When the weight ratio of the high density particle addition to the dispersant is less than 20:1, the dispersant molecules work as bridging agents and can cause aggregation between high density particle addition, and viscosity of the heavy brine can then excessively increase. When the weight ratio of the high density particle addition to the dispersant is greater than 80:1, the dispersant concentration is insufficient and the dispersant molecules are in shortage and the high density particle addition can be aggregated to each other directly without help of dispersant; thus, the aggregated particles of the high density particle addition can be filtered out in the pumping system or in the formation, thereby potentially causing formation damage. The dispersant (when used) can reduce the content ratio of coarse grains, the viscosity of the heavy brine, and/or the potential for formation damage when using the heavy brine with the high density particle addition in accordance with the present invention. The dispersant weight in the heavy brine is not the blending weight, but the weight calculated from the net concentration of dispersant and the high density particle addition in the high density brine.

In another and/or alternative aspect of the present invention, the heavy brine that includes the high density particle addition of the present invention can be added to a $CaBr_2$ brine; however, it can be appreciated that other types of heavy brines can include the high density particle addition of the present invention.

In one non-limiting object of the present invention there is the provision of a fluid having a density of 14.5-23 lbs./gallon (and all values and ranges therebetween) at room temperature (e.g., 77° F.) that is formed from a base brine having a density of 8.9-16 lbs./gallon at room temperature and a plurality of high density particles having a density that is greater than 2.5 g/cc.

In another and/or alternative non-limiting object of the present invention, the high density particles are surface-modified to stabilize their surface in the brine and inhibit flocculation and settling.

In another and/or alternative non-limiting object of the present invention, the fluid has a viscosity of less than 500 cP.

In another and/or alternative non-limiting object of the present invention, the fluid can pass freely through a 2 micron filter.

In another and/or alternative non-limiting object of the present invention, the high density particles are added to the brine at a concentration so as to increase the density of the brine by at least 0.5 lbs./gallon.

In another and/or alternative non-limiting object of the present invention, the plurality of high density particles are selected from particles having an equivalent spherical diameter of 10-500 nm (and all values and ranges therebetween).

In another and/or alternative non-limiting object of the present invention, the surface modification on the high density particles includes one or more coatings of a silane, siloxane such as polydiethylsiloxane, silazane, diol-functionalized silane such as ([3-(2,3-dihydroxypropoxy)propyl]-trimethoxysilane, amine-functionalized silane or other combinations of inorganic-organic coupling agents.

In another and/or alternative non-limiting object of the present invention, the surface modification on the high density particles includes a polyacrylamide or other hydrogel forming molecules grafted and/or coated to the particle surface.

In another and/or alternative non-limiting object of the present invention, the high density particles are added to the base brine at a concentration of about 0.5-5 lbs./gallon (and all values and ranges therebetween).

In another and/or alternative non-limiting object of the present invention, the high density particles are added to the base brine at a concentration of about 0.5-1 lbs./gallon (and all values and ranges therebetween).

In another and/or alternative non-limiting object of the present invention, the high density particles have a mean particle size of less than 300 nm.

In another and/or alternative non-limiting object of the present invention, the high density particles have a mean particle size of greater than 100 nm.

In another and/or alternative non-limiting object of the present invention, the high density particles have a mean particle size of less than 200 nm.

In another and/or alternative non-limiting object of the present invention, the high density particles have a mean particle size of less than 100 nm.

In another and/or alternative non-limiting object of the present invention, the base brine is a NaCl, $CaCl_2$, and/or $CaBr_2$.

In another and/or alternative non-limiting object of the present invention, the base brine is a $CaBr_2$—$CaCl_2$ brine.

In another and/or alternative non-limiting object of the present invention, the base brine includes $ZrBr_2$, $ZrI_2$, $CeBr_2$, potassium formate and/or cesium formate.

In another and/or alternative non-limiting object of the present invention, the high density particles are selected from one or more metals, one or more oxides, one or more ceramics, high density sulfide particles, high density nitride particles, and/or high density intermetallic compound particles.

In another and/or alternative non-limiting object of the present invention, the high density particles include one or more metal particles selected from iron, tungsten, chromium, cobalt, nickel, copper, zinc, manganese, molybdenum, bismuth, lead, and/or tin.

In another and/or alternative non-limiting object of the present invention, the high density particles include one or more oxide and/or ceramic particles selected from $CeO_2$, $WO_3$, $WO_2$, WC, $WCl_3$, FeO, $Fe_3O_4$, $Fe_2O_3$, ferrites, tungstates, $TiO_2$, $Cr_2O_3$, $ZrO_2$, ZnO, zirconates, BaO, PbO, $Bi_2O_3$, $BaTiO_3$, $Al_2O_3$, and/or $SiO_2$.

In another and/or alternative non-limiting object of the present invention, the high density particles include one or more high density sulfide particles, high density nitride particles, and/or high density intermetallic compound particles selected from $WSi_2$, silicides, and/or TaN.

In another and/or alternative non-limiting object of the present invention, the high density particles are coated with an intermediate inorganic coating to control surface chemistry, wherein such coating has a thickness of 0.5-50 nm (and all values and ranges therebetween) and is applied before the optional addition of a coupling and/or dispersion agent.

In another and/or alternative non-limiting object of the present invention, the coating includes $SiO_2$.

In another and/or alternative non-limiting object of the present invention, the coating is added through a chemical process selected from chemical vapor deposition (CVD), atomic layer deposition (ALD), sol-gel, or some other chemical process.

In another and/or alternative non-limiting object of the present invention, the fluid includes a dispersant.

In another and/or alternative non-limiting object of the present invention, the dispersant is selected from a) a polymer dispersant having an ammonium acrylate salt as a constituent unit of the copolymer component including ammonium polyacrylate salt, and copolymer ammonium salt of alkyl polyacrylate and acrylate, and/or b) two or more types of dispersant including at least one type of polymer dispersant having ammonium acrylate salt as constituent unit as copolymer component, and at least one type selected from other dispersants.

In another and/or alternative non-limiting object of the present invention, the dispersant includes a water-soluble anionic dispersant selected from triethanolamine lauryl sulfate, ammonium lauryl sulfate, triethanolamine polyoxy ethylene alkyl ether sulfate, poly styrene sulfonic acid, poly acrylamido methylpropanesulfonate, 2-acrylamido-2-methylpropanesulfonate, 3-(methacryloylamino)propyl]dimethyl (3-sulfopropyl) ammonium hydroxide, Poly(2-acrylamido-3-methylpropnaesulfonate), and/or poly(2-acrylamido-2-methyl-1-propanesulfonic acid-co-acrylic acid) with various ratios of comonomers.

In another and/or alternative non-limiting object of the present invention, the dispersant includes a polymer dispersant of polycarboxylate type that includes a polymer of carboxylic monomer having unsaturated double bond such as acrylic acid, methacrylic acid, maleic acid, fumaric acid, itaconic acid, copolymer of carboxylic monomer having unsaturated double bond and/or other monomer having unsaturated double bond, and ammonium salt or amine salt of them.

In another and/or alternative non-limiting object of the present invention, the dispersant includes a water-soluble nonionic dispersant selected from polyoxyethylene lauryl ether, polyoxyethylene cetyl ether, polyoxyethylene stearyl ether, polyoxyethylene oleyl ether, polyoxyethylene higher alcohol ether, polyoxyethylene octyl phenyl ether, polyoxyethylene nonyl phenyl ether, polyoxyalkylene alkylether, polyoxyethylene derivative, polyoxyethylenesorbitan monolaurate, polyoxyethylene sorbitan monopalmitate, polyoxyethylene sorbitan monostearate, polyoxyethylene sorbitan tristearate, polyoxyethyelene sorbitan mono-oleate, polyoxy ethylene sorbitan trioleate, tetraoleic polyoxyethylene sorbit, polyethylene glycol monolaurate, polyethylene glycol monostearate, polyethylene glycol distearate, polyethylene glycol mono-oleate, polyoxyethylene alkylamine, polyoxyethylene cured castor oil, 2-hydroxyethyl methacrylate, and/or alkyl alkanolamide.

In another and/or alternative non-limiting object of the present invention, the dispersant includes a water-soluble cationic dispersant include polyvinyl pyrrolidone, coconut amine acetate, and/or stearyl amine acetate.

In another and/or alternative non-limiting object of the present invention, the dispersant includes water-soluble biphoteric dispersant such as lauryl betaine, stearyl betaine, lauryl dimethylamine oxide, poly(sulfobetaine methacrylamide), block copolymers of (sulfobetaine methacrylamide)/(methacrylic acid), 3-([dimethyl(3-trimethoxysilyl)propyl]ammonio)propane-1-sulfonate, and/or 2-alkyl-N-carboxymethyl-N-hydroxy ethyl imidazolinium betaine.

In another and/or alternative non-limiting object of the present invention, a weight ratio of the particle addition to said dispersant is 20-80:1 (and all values and ranges therebetween), typically about 25-70:1, and more typically 30-50:1.

In another and/or alternative non-limiting object of the present invention, the dispersant includes polyacrylamide that has been chemically added to a coupling agent after application of the coupling agent to said high density particle.

In another and/or alternative non-limiting object of the present invention, the fluid is used in drill-in, completion, or workover operations.

In another and/or alternative non-limiting object of the present invention, there is provided a method for forming said fluid comprising providing a base brine having a density of 8.9-16 lbs./gallon at room temperature and adding a plurality of said high density particles to the base brine to form a fluid having a density of 14.5-23 lbs./gallon at room temperature.

DESCRIPTION OF THE INVENTION

The present invention relates to drilling and completion fluids for use in hydrocarbon-bearing and geothermal subterranean formations and to methods of drilling and completing subterranean zones using those fluids. The present invention is directed to a high-density brine. The high density brine includes the addition of modified high density nanoparticles that have been surface-modified. The resultant brine eliminates the need for toxic, corrosive, and costly $ZrBr_2$ or Cesium formate additions or other ionic additives to boost the brine density to 15-17 lbs./gallon or greater.

The properties of a calcium bromide heavy brine are set forth in the below table.

TABLE 1

Calcium Bromide Density and Composition Information

| Density Lbs./gal. | Spec Gravity SG | Water Bbl | $CaBr_2$ lbs. 95% | $CaBr_2$ wt. % | Br wt. % | TCT ° F. |
|---|---|---|---|---|---|---|
| 11.6 | 1.393 | 0.860 | 186 | 36.3 | 29.0 | −32 |
| 11.7 | 1.405 | 0.856 | 192 | 37.1 | 29.7 | −36 |
| 11.8 | 1.417 | 0.852 | 198 | 37.9 | 30.3 | −40 |
| 11.9 | 1.429 | 0.848 | 203 | 38.6 | 30.9 | −45 |
| 12.0 | 1.441 | 0.844 | 209 | 39.3 | 31.4 | −50 |
| 12.1 | 1.453 | 0.840 | 214 | 40.1 | 32.1 | −55 |
| 12.2 | 1.465 | 0.836 | 220 | 40.8 | 32.6 | −61 |
| 12.3 | 1.477 | 0.832 | 226 | 41.5 | 33.1 | −67 |
| 12.4 | 1.489 | 0.828 | 231 | 42.2 | 33.7 | −73 |
| 12.5 | 1.501 | 0.824 | 237 | 42.8 | 34.2 | −80 |
| 12.6 | 1.513 | 0.820 | 242 | 43.5 | 34.8 | −88 |
| 12.7 | 1.525 | 0.816 | 248 | 44.2 | 35.3 | −92 |
| 12.8 | 1.537 | 0.811 | 254 | 44.8 | 35.8 | −96 |
| 12.9 | 1.549 | 0.807 | 259 | 45.5 | 36.4 | −87 |
| 13.0 | 1.561 | 0.803 | 265 | 46.1 | 36.9 | −78 |
| 31.1 | 1.573 | 0.799 | 271 | 46.8 | 37.4 | −70 |
| 13.2 | 1.585 | 0.794 | 277 | 47.4 | 37.9 | −63 |
| 13.3 | 1.597 | 0.790 | 282 | 48.0 | 38.4 | −53 |
| 13.4 | 1.609 | 0.786 | 288 | 48.6 | 38.9 | −43 |
| 13.5 | 1.621 | 0.781 | 294 | 49.2 | 39.3 | −39 |
| 13.6 | 1.633 | 0.777 | 299 | 49.8 | 39.8 | −34 |
| 13.7 | 1.645 | 0.772 | 305 | 50.4 | 40.3 | −27 |
| 13.8 | 1.657 | 0.768 | 311 | 51.0 | 40.8 | −20 |
| 13.9 | 1.669 | 0.763 | 317 | 51.6 | 41.3 | −13 |
| 14.0 | 1.681 | 0.758 | 323 | 52.1 | 41.7 | −7 |
| 14.1 | 1.693 | 0.754 | 328 | 52.7 | 42.1 | 1 |
| 14.2 | 1.705 | 0.751 | 333 | 53.1 | 42.5 | 10 |
| 14.3 | 1.717 | 0.744 | 340 | 53.8 | 43.0 | 17 |
| 14.4 | 1.729 | 0.739 | 346 | 54.3 | 43.4 | 23 |
| 14.5 | 1.741 | 0.734 | 352 | 54.9 | 43.9 | 30 |
| 14.6 | 1.753 | 0.730 | 358 | 55.4 | 44.3 | 36 |
| 14.7 | 1.765 | 0.724 | 364 | 56.0 | 44.8 | 43 |
| 14.8 | 1.777 | 0.719 | 370 | 56.5 | 45.2 | 50 |
| 14.9 | 1.789 | 0.714 | 376 | 57.0 | 45.6 | 56 |
| 15.0 | 1.801 | 0.709 | 382 | 57.6 | 46.1 | 61 |
| 15.1 | 1.813 | 0.704 | 388 | 58.1 | 46.5 | 66 |

TCT—crystallization temperature
BBL—barrel (approx.. 42 gallons per barrel)
Specific gravity measured at 77°G From Table 1, the maximum obtainable density for $CaBr_2$ brine is 15.1 lbs./gal. at 66° F. (the maximum temperature of most well completion operations). However, a density of 15.1 lbs./gal. $CaBr_2$ brine cannot be used for deep water operations since the crystallization of the $CaBr_2$ brine at such density is too high due to the cold deep water effects on the riser. Typically, the maximum density for $CaBr_2$ brine that can be used in deep water operation is 14.5 lbs./gal., which $CaBr_2$ brine has a crystallization temperature of 30° F. In some deep water operations, the $CaBr_2$ brine needs to have an even lower density.

In accordance with the present invention, the usable density of $CaBr_2$ brine in deep water operations has been increased to 16 lbs./gal. or greater by the addition of the high density particle addition to the $CaBr_2$ brine. In one non-limiting embodiment of the invention, high density particle addition in the form of cerium oxide particles having a particle size of about 60-80 nm, and a density of about 7.22 g/cm$^3$ where added to the $CaBr_2$ brine to achieve a density of the modified $CaBr_2$ brine of about 17 lbs./gal. without creating solids in the modified $CaBr_2$ brine that would plug the well formation or the filter press and filter cartridge. As such, modified $CaBr_2$ brine can be classified as a solids-free completion fluid.

Non-limiting benefits related to the high density particle addition to a heavy brine in accordance with the present invention include:
lower crystallization temperature of the modified brine at higher densities;
no special equipment required to use the modified brine;
the modified brine is stable at high density and temperatures;
the modified brine has a low viscosity;
the modified brine can be readily available in bulk;
the modified brine does not contain pollutants;
the modified brine meets current U.S. environmental requirements;
the modified brine can be re-used like regular completion fluids; and
the modified brine is not a safety or health hazard to personnel or marine life.

Non-limiting applications of the modified heavy brine that includes the high density particle addition include:
reservoir drill-in fluid;
completion fluid;
workover fluid;
packer fluid;
gravel pack fluid; and
potential for frac fluid.

The surface modified particle as envisioned in this invention can be transformed into a liquid-free form, as an easily transported densifier for multiple brine systems.

Example 1

35 nm $SiO_2$ particles were surface functionalized with the silane diol ether ([3-(2,3-dihydroxypropoxy)propyl]-trimethoxysilane to form a functionalized particle with a single coating. The coated particle was added to a $CaBr_2$ brine and formed a stable dispersion of 5 wt. % silica particulate, 51.5 wt. % $CaBr_2$ with a density of 14.9 lbs./gal and a viscosity <20 cP at room temperature (e.g., 77° F.).

Example 2

A short chain silane coupling agent with a diol functionality was grafted to 80 nm $SiO_2$ particles. The coated silica particles were then isolated to a powder form via a drying process. This dry, treated silica was then added to a 52 wt. % $CaBr_2$ brine at a rate of 1 part powder to 12 parts brine by weight. The mixture was then sonicated and resulted in a stable dispersion that was filterable with a 2 micron filter and had a density of 14.6 lbs./gal at room temperature.

Example 3

150 nm $CeO_2$ particles were surface modified by reacting with polydiethylsiloxane. The modified $CeO_2$ particles were dispersed in $CaBr_2$ clear brine using a high shear mixer at a rate of 1 kg of particles to 1 gallon of 15.4 lbs./gallon $CaBr_2$ brine. The resultant heavy brine had a density of 17.2 lbs./gallon at room temperature (i.e., 77° F.). The high density brine was passed through a 2 micron filter without changing density. The viscosity of the $CaBr_2$ brine was increased less than 20%, and the change in crystallization temperature is less than 5° C.

Example 4

150 nm $ZrO_2$ particles were surface modified by reacting with polydiethylsiloxane. 1 kg of surface functionalized $ZrO_2$ particles was added to 1 gallon of 15.4 lbs./gallon $CaBr_2$ clear brine. The resultant fluid had a density of 17.0 lbs./gallon at room temperature (i.e., 77° F.).

Example 5

100 nm $CeO_2$ powder was surface treated by grafting on polyacrylamide ligands. The PAA grafted $CeO_2$ particles were mixed in a standard sand mixer with 14.8 lbs./gallon $CaBr_2$ clear brine at a rate of 1.1 kg/gallon. After stabilizing for 4 hours, the resultant fluid had a density of 17 lbs./gallon at room temperature (i.e., 77° F.).

Example 6

85 nm $CeO_2$ was surface activated with a nitric acid and peroxide treatment to facilitate coating the particle with and amine functionalized silane coupling agent. The amine functionality enabled the addition of an additional polysulfonic acid ligand to the particle/shell structure. When the treated particles are added to a 14.2 lbs./gal $CaBr_2$ brine, no precipitant or settling was observed. The final density of the mixture was 14.7 lbs./gal.

Example 7

Using an application rate of 1 gm of tetraethyl orthosilicate per gm of $BaTiO_3$, 120 nm $BaTiO_3$ particles were coated with a 12 nm layer of silica to enhance its ability to accept an alternate coating or functionalization. This material was then treated/coated with an amine functionalized silane coupling agent, KH-550 at a loading of 5 umol/m$^2$ of $BaTiO_3$. A dispersant layer of polyacrylamide methylpropanesulfonic acid was added to the functionalized tail of the silane at a loading of 7 wt. % dispersant/$BaTiO_3$, thus creating particles with multiple coatings. When 12 wt. % of this particulate was added to a 9.5 lbs./gal NaCl brine, the resulting solution was readily filterable through a 2 micron filter, had a viscosity <15 cP at room temperature (e.g., 77° F.), and a density of 10.4 lbs./gal.

In Examples 1-7, the silica coating is applied to the particles using tetraethyl orthosilicate (TEOS) in a base catalyzed setting. The application rate is typically in the range of 0.4 to 1.5 gm (and all values and ranges therebetween) of TEOS per gram of particulate and more typically in the range of 0.75 to 1.2 gm/gm (and all values and ranges therebetween). The coupling agent (when used) is generally added to the densifying particulate at a loading of 3.0 to 11 umol/m$^2$ of particle surface area (and all values and ranges therebetween), and typically at a loading of 4.0 to 8.0 umol/m$^2$. Dispersant use is dependent on the dispersant type as well as the particulate. Loadings are in the range of 5-15 wt. % dispersant/mass of particulate (and all values and ranges therebetween).

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. A fluid having a density of 15-23 lbs./gallon at room temperature comprising:
   a. a base brine having a density of 8.9-16 lbs./gallon at room temperature; and,
   b. a plurality of high density particles having a density greater than 5 g/cc, said high density particles have been surface modified for dispersion in said base brine and/or to inhibit or prevent settling of said high density particles in said base brine, said surface modification of said high density particles include one or more coatings of silane and/or siloxane, said silane and/or siloxane includes polydiethylsiloxane.

2. The fluid as defined in claim 1, wherein said surface modification of said high density particles includes a polyacrylamide or other hydrogel-forming molecules attached to the particle surface.

3. The fluid as defined in claim 1, wherein said high density particles are added to said base brine at a concentration of about 1-5 lbs./gallon, and typically about 0.5-2 kg/gallon.

4. The fluid as defined in claim 1, wherein said high density particles have a mean particle size of less than 500 nm.

5. The fluid as defined in claim 1, wherein said high density particles have a mean particle size of greater than 100 nm.

6. The fluid as defined in claim 1, wherein said high density particles have a mean particle size of less than 200 nm.

7. The fluid as defined in claim 1, wherein said base brine is a $CaBr_2$ brine.

8. The fluid as defined in claim 7, wherein said base brine includes $CaCl_2$ additions.

9. The fluid as defined in claim 7, wherein said base brine includes $ZrBr_2$, $ZaI_2$, and/or $CeBr_2$ additions.

10. The fluid as defined in claim 1, wherein said high density particles are selected from iron, tungsten, chromium, cobalt, nickel, copper, zinc, manganese, molybdenum, bismuth, lead, and/or tin; and/or the particles can be oxide or ceramic particles such as, but not limited to, $CeO_2$, $WO_3$, $WO_2$, $WC$, $WCl_3$, $FeO$, $Fe_3O_4$, $Fe_2O_3$, ferrites, tungstates, $TiO_2$, $Cr_2O_3$, $ZrO_2$, $ZnO$, zirconates, $BaO$, $PbO$, $SiO_2$, $Al_2O_3$, $BaTiO_3$, and/or $Bi_2O_3$, or other oxide or ceramic particles or other high density sulfide, nitride, oxide, or intermetallic compound particles.

11. The fluid as defined in claim 1, wherein said fluid is used in drill-in, completion, or workover operations.

12. A fluid having a density of 14.5-23 lbs./gallon at room temperature comprising:
   a base brine having a density of 8.9-16 lbs./gallon at room temperature; and,
   a plurality of high density particles having a density greater than 2.5 g/cc, wherein such particles have been surface-modified to stabilize their surface in the brine and inhibit flocculation and settling, wherein the resultant fluid has a viscosity of less than 500 cP, said surface modification of said high density particles includes one or more coatings of silane and/or siloxane wherein the resultant fluid passes freely through a 2 micron filter, and wherein the particles are added at a concentration so as to increase the fluid density by at least 0.5 lbs./gallon, said silane and/or siloxane includes polydiethylsiloxane.

13. The fluid as defined in claim 12, wherein said plurality of high density particles are selected from particles having an equivalent spherical diameter of 10-500 nm.

14. The fluid as defined in claim 12, wherein said surface modification of said high density particles includes a polyacrylamide or other hydrogel-forming molecules grafted or coated to the particle surface.

15. The fluid as defined in claim 12, wherein said high density particles are added to said base brine at a concentration of about 0.5-5 lbs./gallon.

16. The fluid as defined in claim 12, wherein said high density particles are added to said base brine at a concentration of about 0.5-1 kg/gallon.

17. The fluid as defined in claim 12, wherein said high density particles have a mean particle size of less than 300 nm and greater than 100 nm.

18. The fluid as defined in claim 12, wherein said high density particles have a mean particle size of less than 200 nm and greater than 100 nm.

19. The fluid as defined in claim 12, wherein said high density particles have a mean particle size of less than 100 nm.

20. The fluid as defined in claim 12, wherein said base brine is a $NaCl$, $CaCl_2$, and/or $CaBr_2$.

21. The fluid as defined in claim 12, wherein said base brine is a $CaBr_2$—$CaCl_2$ brine.

22. The fluid as defined in claim 12, wherein said base brine includes $ZrBr_2$, $ZrI_2$, $CeBr_2$, potassium formate and/or cesium formate.

23. The fluid as defined in claim 12, wherein said high density particles are selected from one or more metals, one or more oxides, one or more ceramics, high density sulfide particles, high density nitride particles, and/or high density intermetallic compound particles.

24. The fluid as defined in claim 12, wherein said high density particles include one or more metal particles selected from iron, tungsten, chromium, cobalt, nickel, copper, zinc, manganese, molybdenum, bismuth, lead, and/or tin.

25. The fluid as defined in claim 12, wherein said high density particles include one or more oxide and/or ceramic particles selected from $CeO_2$, $WO3$, $WO2$, $WC$, $WCl_3$, $FeO$, $Fe_3O_4$, $Fe_2O_3$, ferrites, tungstates, $TiO_2$, $Cr_2O_3$, $ZrO_2$, $ZnO$, zirconates, $BaO$, $PbO$, $Bi_2O_3$, $BaTiO_3$, $Al_2O_3$, and/or $SiO_2$.

26. The fluid as defined in claim 12, wherein said high density particles include one or more high density sulfide particles, high density nitride particles, and/or high density intermetallic compound particles selected from $WSi_2$, silicides, and/or TaN.

27. The fluid as defined in claim 12, wherein said high density particles are coated with an intermediate inorganic coating to control surface chemistry, wherein such coating has a thickness of 0.5-50 nm and is applied before the optional addition of a coupling and/or dispersion agent.

28. The fluid as defined in claim 27, wherein said coating includes $SiO_2$.

29. The fluid as defined in claim 27, wherein said coating is added through a chemical process selected from chemical vapor deposition (CVD), atomic layer deposition (ALD), sol-gel, or some other chemical process.

30. The fluid as defined in claim 12, including a dispersant, said dispersant is selected from a) a polymer dispersant having an ammonium acrylate salt as a constituent unit of the copolymer component including ammonium polyacrylate salt, and copolymer ammonium salt of alkyl polyacrylate and acrylate, and/or b) two or more types of dispersant including at least one type of polymer dispersant having ammonium acrylate salt as constituent unit as copolymer component, and at least one type selected from other dispersants.

31. The fluid as defined in claim 30, wherein said dispersant includes a water-soluble anionic dispersant selected from triethanolamine lauryl sulfate, ammonium lauryl sulfate, triethanolamine polyoxy ethylene alkyl ether sulfate, poly styrene sulfonic acid, poly acrylamido methylpropanesulfonate, 2-acrylamido-2-methylpropanesulfonate, 3-(methacryloylamino)propyl]dimethyl(3-sulfopropyl) ammonium hydroxide, Poly(2-acrylamido-3-methylpropnaesulfonate), and/or poly(2-acrylamido-2-methyl-1-propanesulfonic acid-co-acrylic acid) with various ratios of comonomers.

32. The fluid as defined in claim 30, wherein said dispersant includes a polymer dispersant of polycarboxylate type include polymer of carboxylic monomer having unsaturated double bond such as acrylic acid, methacrylic acid, maleic acid, fumaric acid, itaconic acid, copolymer of carboxylic monomer having unsaturated double bond and/or other monomer having unsaturated double bond, and ammonium salt or amine salt of them.

33. The fluid as defined in claim 30, wherein said dispersant includes a water-soluble nonionic dispersant selected from polyoxyethylene lauryl ether, polyoxyethylene cetyl ether, polyoxyethylene stearyl ether, polyoxyethylene oleyl ether, polyoxyethylene higher alcohol ether, polyoxyethylene octyl phenyl ether, polyoxyethylene nonyl phenyl ether, polyoxyalkylene alkylether, polyoxyethylene derivative, polyoxyethylenesorbitan monolaurate, polyoxyethylene sorbitan monopalmitate, polyoxyethylene sorbitan monostearate, polyoxyethylene sorbitan tristearate, polyoxyethyelene sorbitan mono-oleate, polyoxy ethylene sorbitan trioleate, tetraoleic polyoxyethylene sorbit, polyethylene glycol monolaurate, polyethylene glycol monostearate, polyethylene glycol distearate, polyethylene glycol mono-oleate, polyoxyethylene alkylamine, polyoxyethylene cured castor oil, 2-hydroxyethyl methacrylate, and/or alkyl alkanolamide.

34. The fluid as defined in claim 30, wherein said dispersant includes a water-soluble cationic dispersant include polyvinyl pyrrolidone, coconut amine acetate, and/or stearyl amine acetate.

35. The fluid as defined in claim 30, wherein said dispersant includes water-soluble biphotetic dispersant such as lauryl betaine, stearyl betaine, lauryl dimethylamine oxide, poly(sulfobetaine methacrylamide), block copolymers of (sulfobetaine methacrylamide)/(methacrylic acid), 3-(3-dimethyl (3-trimethoxysilyl)propyl]ammonio)propane-1-sulfonate, and/or 2-alkyl-N-carboxymethyl-N-hydroxy ethyl imidazolinium betaine.

36. The fluid as defined in claim 30, wherein a weight ratio of the particle addition to said dispersant is 20-80:1.

37. The fluid as defined in claim 30, wherein said dispersant includes polyacrylamide that has been chemically added to a coupling agent after application of the coupling agent to said high density particle.

38. The fluid as defined in claim 12, wherein said fluid is used in drill-in, completion, or workover operations.

39. A method for forming said fluid as defined in claim 1 comprising:
   a. providing a base brine having a density of 8.9-16 lbs./gallon at room temperature; and,
   b. adding a plurality of said high density particles as defined in claim 1 to said base brine to form a fluid having a density of 14.5-23 lbs./gallon at room temperature.

40. A fluid having a density of 14.5-23 lbs./gallon at room temperature for use in drill-in or completion operations in a well, said fluid comprising:
   a base brine having a density of 8.916 lbs./gallon at 77° F.; and,
   a plurality of high density particles having a density greater than 2.5 g/cc, said plurality of high density particles surface modified with one or more coatings of silane and/or siloxane, said plurality of high density particles added to said base brine in a quantity to includes the density of said fluid by at least 0.5 lbs./gallon as compared to said base brine absent said plurality of high density particles, said plurality of high density particles selected from particles having an equivalent spherical diameter of 10-500 nm, said high density particles added to said base brine at a concentration of about 0.5-5 lbs./gallon, said silane and/or siloxane includes polydiethylsiloxane;
   wherein said fluid has a viscosity of less than 500 cP at 77° F., and
   wherein said resultant fluid passes freely through a 2 micron filter, and wherein the particles are added at a concentration to increase the fluid density by at least 0.5 lbs./gallon.

41. The fluid as defined in claim 40, wherein said base brine includes one or more of NaCl, $CaCl_2$, $ZrBr_2$, $ZrI_2$, $CeBr_2$, potassium formate, cesium formate, and $CaBr_2$.

42. The fluid as defined in claim 40, wherein said plurality of high density particles include one or more metal particles, oxide particles, nitride particles, silicide particles, and/or sulfide particles, said one or more metal particles selected from the group consisting of iron, tungsten, chromium, cobalt, nickel, copper, zinc, manganese, molybdenum, bismuth, lead, and tin, said one or more oxide particles selected from the group consisting of $CeO_2$, $WO_3$, $WO_2$, WC, $WCl_3$, FeO, $Fe_3O_4$, $Fe_2O_3$, ferrites, tungstates, $TiO_2$, $Cr_2O_3$, $ZrO_2$, ZnO, zirconates, BaO, PbO, $Bi_2O_3$, $BaTiO_3$, $Al_2O_3$, and $SiO_2$.

43. The fluid as defined in claim 40, wherein said plurality of high density particles are coated with an intermediate inorganic coating, said intermediate inorganic coating having a coating thickness of 0.5-50 nm, said intermediate inorganic coating including $SiO_2$.

44. The fluid as defined in claim 40, said fluid including a dispersant, said dispersant selected from a) a polymer dispersant having an ammonium acrylate salt as a constituent unit of the copolymer component including ammonium polyacrylate salt, and copolymer ammonium salt of alkyl polyacrylate and acrylate, and/or b) two or more types of dispersant including at least one type of polymer dispersant having ammonium acrylate salt as constituent unit as copolymer component, and at least one type selected from other dispersants, a weight ratio of said plurality of high density particles to said dispersant in said fluid is 20-80:1.

* * * * *